United States Patent Office 3,448,088
Patented June 3, 1969

3,448,088
CROSSLINKED INTERPOLYMERS
Julian Louis Azorlosa, Dover, Del., assignor to GAF Corporation, New York, N.Y., a corporation of Delaware
No Drawing. Filed June 14, 1966, Ser. No. 557,363
Int. Cl. C08f *15/40, 15/14*
U.S. Cl. 260—78.5       5 Claims

ABSTRACT OF THE DISCLOSURE

A water-soluble crosslinked interpolymer comprising substantially equi-molar quantities of maleic anhydride and a monovinyl alkyl ether and 0.001 to 0.2 mole percent of a crosslinking agent comprising a divinyl ether of an aliphatic diol. Such water-soluble crosslinked interpolymers are useful as viscosity improvers.

---

This invention relates to novel water-soluble branched or cross-linked interpolymers of (1) an alkyl vinyl ether, (2) maleic anhydride and (3) a divinyl ether of an aliphatic diol found to be useful as viscosity improvers.

The need for satisfactory water-soluble thickening agents has been a long standing problem in the art. Heretofore, cross-linked interpolymers derived from alkyl vinyl ethers, maleic anhydride and a polymerizable divinyl compound have been found to be either water-insoluble or merely water-swellable, or if water-soluble, have one or more of the decided disadvantages such as being difficult to prepare, being of low molecular weight or being of such quality as to only slightly raise the viscosity of a composition.

This need for water-soluble interpolymers has now been met by my discovery of water-soluble branched or cross-linked interpolymers which are derivatives of maleic anhydride, a vinyl alkyl ether and as the cross-linking agent, a divinyl ether of an aliphatic diol. The instant interpolymers are unique in that they not only have a high molecular weight, good stability and good solubility, but afford compositions with very high viscosities even at low pH concentrations, as well as being useful for gelation and/or flocculation. The character of these novel interpolymers is indeed surprising because heretofore interpolymers having such diversified properties appeared impossible.

Branched or cross-linked interpolymers coming within the purview of this invention are the novel water-soluble cross-linked interpolymers comprising substantially equi-molar quantities of maleic anhydride and a monovinyl alkyl ether wherein the alkyl group contains from 1 to 4 carbon atoms and 0.001 to 0.2 mole percent of a cross-linking agent having the formula selected from the class consisting of:

$$H_2C=CH-O-X_1-OCH=CH_2$$

and $$H_2C=CH-(OX_2)_n-OCH=CH_2$$

wherein X represents an alkylene group of from 2 to 12 carbon atoms, preferably from 2 to 6 carbon atoms and wherein $X_2$ represents an alkylene group of from 2 to 4 carbon atoms and wherein $n$ represents an integer from of 2 to 100, preferably from 2 to 4. The novel interpolymers can be represented by the following general formula:

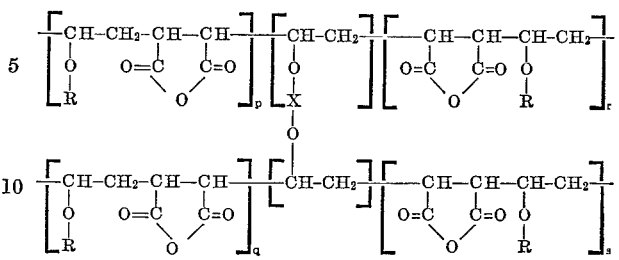

wherein the sum of the values of $p$, $q$, $r$, and $s$ may be any value between 5 to 1000, and the molar ratio of monovinyl ether units to divinyl ether units is of 0.001 to 0.2 and wherein R represents an alkyl radical, the same or different, selected from the group consisting of methyl, ethyl, propyl, isopropyl, butyl and isobutyl, and wherein X represents a radical selected from the group consisting of $(CH_2)_n$, wherein $n$ represents an integer from 2 to 12 and $-CH_2-CH_2(OCH_2-CH_2)_{n_2}$ wherein $n_2$ represents an integer from 1 to 99.

These novel compounds may be prepared by conventional known methods, for example, by interpolymerizing maleic anhydride and a mixture of the monovinyl ether and divinyl ether of an aliphatic diol using approximately one mole of maleic anhydride per mole of the monovinyl ether moiety. A small molar excess of the monovinyl ether (5 to 10%) above that of the maleic anhydride may be advantageous for insuring complete conversion of the maleic anhydride. The polymerization is carried out conveniently by preparing a solvent solution of the monomers and adding a catalytic amount (preferably from 0.001 to 1.0%), of an organic free-radical-generating initiator. Then the resulting solution is mixed thoroughly and heated sufficiently so that the polymerization reaction takes place. At the completion of the polymerization reaction the precipitated interpolymer is isolated by any suitable means, such as by filtration, washed with fresh solvent and vacuum dried. Moreover, the polymerization may also be conducted by adding a solution of the vinyl ethers to a solution of initiator, maleic anhydride and solvent, or by adding a solution of divinyl ether to a solution of maleic anhydride, monovinyl ether, solvent and initiator.

The amount of solvent is not critical and such solvents as benzene, toluene, xylene, acetone, methyl ethyl ketone and methylene chloride, and the like may be used, however, benzene is considered the most suitable from the standpoint of product isolation and obtaining high molecular weights.

Among the organic free-radical-generatng initiators that may be mentioned are azoisobutyronitrile, benzoyl peroxide, lauroyl peroxide, caprylyl peroxide, acetyl peroxide, acetyl benzoyl peroxide, di-tert-butyl peroxide or dimethyl azoisobutrate and the like. Mixtures of such catalysts are also suitable in the process of making the interpolymers of the invention. Radiation polymerization can be used, too, e.g., such high energy radiation sources as ultraviolet light, X-rays, γ-rays, neutrons and the like can be used to initiate polymerization.

The polymerization may be carried out at a temperature within the range of 0 to 150° C., preferred temperatures lie for the most part in the range from 50 to 100° C., particularly about 60–80° C.

The amounts of monovinyl ether and the divinyl ether of an aliphatic diol may vary over a wide range, for example, the molar ratio of monovinyl ether to divinyl ether may be between 5 to 1000 (i.e., molar ratio of divinyl ether to monovinyl ether of 0.001 to 0.2); for high aqueous viscosities a molar ratio range of from 10 to 200 is preferred. Among the monovinyl ethers that may be mentioned are methyl vinyl ether, ethyl vinyl ether, propyl vinyl ether, isopropyl vinyl ether, butyl vinyl ether, and isobutyl vinyl ether. Examples of the divinyl ethers of an aliphatic diol that may be mentioned are the divinyl ethers of 1,2-ethanediol; 1,3-propanediol; 1,4-butanediol; 1,5-pentanediol; 1,6-hexanediol; 1,7-heptanediol; 1,8-octanediol; 1,9-nonanediol; 1,10-decanediol; 1,11-unidecanediol and 1,12-dodecanediol, as well as the divinyl ethers of diethylene glycol, triethylene glycol, tetraethylene glycol, pentaethylene glycol, hexaethylene glycol, heptaethylene glycol, octoethylene glycol, nonaethylene glycol, decaethylene glycol, and further polyalkylene glycols up to a molecular weight of about 5,900. If desired, multivinyl ethers of aliphatic compounds (polyols) could also be used, for example, glycerine, pentaerythritol, 1,2,4 - butanediol, manitol hexavinyl ether and the like.

The instant novel compounds are very effective thickening and gelling agents and may be used as thickening agent for both aqueous and organic systems, for example, latices and paint remover compositions, for example, at 0.5% concentration in $H_2O$ (pH adjusted to 5.5 with NaOH) Brookfield viscosities as high as 97,000 cps. have been obtained. The aqueous viscosity stability is substantially better than that of the uncrosslinked methyl vinyl ether-maleic anhydride copolymer. Moreover, the instant interpolymers may also be used as a flocculant for suspended matter or a stabilizer for heavy duty liquid detergents, and many other uses.

The following examples are illustrative of the present invention and are not to be regarded as limitative. It is to be understood that all parts, percentages and proportions referred to herein and in the appended claims are by weight unless otherwise indicated. The viscosities listed in the following examples were obtained with a Brookfield rotation viscometer and the value expressed in centipoises.

EXAMPLE I

A solution of methyl vinyl ether-maleic anhydride was prepared according to the following process:

49.0 g. (0.50 mole) of maleic anhydride were dissolved in 350 ml. benzene. The slightly hazy solution was filtered into 500 ml. volumetric flask to remove free maleic acid. Then 0.098 g. of azobisisobutyronitrile were dissolved therein. The stoppered flask was cooled to about 8° C. in an ice bath. The cooled flask was placed on a triple beam balance and a slight excess over 32.0 g. (0.55 mole) of liquid pure methyl vinyl ether were added. The excess was allowed to evaporate so that 32.0 g. of methyl vinyl ether were the net amount added. The capped volumetric flask was carefully inverted three times to insure mixing and cooled to about 5° C. The volume was made up to 500 ml. at about 5° C. with more benzene and the flask inverted several times to insure uniformity. This methyl vinyl ether-maleic anhydride copolymer solution was labeled Solution M and stored at about 5° C., at which temperature little or no polymerizaton took place.

A solution of divinyl ether of 1,4-butanediol was made up by weighing 3.20 g. of the divinyl ether of 1,4-butanediol and adding same to 50 ml. volumetric flask. Benzene was added at room temperature to make up a 50 ml. solution. This solution was labeled Solution DVE.

Several Pyrex polymerization tubes were charged as follows:

| Tube | Milliliters | | | | |
|---|---|---|---|---|---|
| | Control | A | B | C | D |
| Solution M | 90 | 100 | 100 | 100 | 100 |
| Solution DVE | None | 2 | 4 | 6 | 8 |

The tubes were cooled to −75° C. in a Dry Ice-acetone bath, evacuated to 20 mm. and flushed with nitrogen gas three times, and finally reevacuated to 20 mm. The necks of the polymerization tubes were then sealed off by means of a glass-blowing torch. The sealed tubes were stored in a 5° C. refrigerator overnight. The next morning they were allowed to warm to room temperature, were shaken to insure uniform solutions and placed in a 55.2° C., constant temperature water bath for 5 hours and 5 minutes. After removing and cooling to room temperature the tubes were opened. A voluminous precipitate of polymer had formed in each tube. To each tube was added 50 ml. benzene to thin out the system. This was filtered through a tared, sintered-glass funnel. The tube was rinsed as free as possible of polymer by adding 50 ml. more benzene in three portions and filtering as before. The filter cake was reslurried twice in the filter funnel with 50 ml. portions of benzene and sucked as dry as possible. This was done to remove any residual unreacted monomers. The polymer samples were dried to constant weight in a 45° vacuum oven; yielding fine particle size powders in amounts indicated as follows:

| Tube | Control | A | B | C | D |
|---|---|---|---|---|---|
| Wt. percent divinyl ether of 1,4-butanediol used (based on methyl vinyl ether) | 0 | 2.0 | 4.0 | 6.0 | 8.0 |
| Wt. of polymer, g. isolated | 12.08 | 13.46 | 13.38 | 13.38 | 12.78 |

A 0.500 g. sample of each polymer was added to 99.5 g. of distilled water and allowed to stand at room temperature for a week, then Brookfield viscosities were determined before and after adjusting the pH to 5.6 to 6.0 with 20% NaOH.

The results were as follows:

| Run No. | pH | Before addn. of NaOH, Brookfield visc., cps. | Spindle speed, r.p.m. | Spindle No. |
|---|---|---|---|---|
| Control | 2.5 | 8.5 | 60 | 1 |
| A | 2.6 | 316 | 60 | 4 |
| B | 2.7 | 63 | 60 | 4 |
| C | 3.0 | 276 | 60 | 4 |
| D | 2.8 | 99 | 60 | 4 |

| Run No. | pH | pH adjusted with NaOH, Brookfield visc., cps. | Spindle speed, r.p.m. | Spindle No. |
|---|---|---|---|---|
| Control | 5.8 | 126 | 60 | 1 |
| A | 5.7 | 3,450 | 60 | 4 |
| B | 5.6 | 6,420 | 60 | 4 |
| C | 5.8 | 9,560 | 60 | 4 |
| D | 6.00 | >10,000 | 60 | 4 |
| | | 18,200 | 30 | 4 |
| | | 60,900 | 6 | 4 |

The viscosity stability of 0.50% aqueous solutions was determined by measuring the Brookfield viscosity after various intervals at 80° C. The following data demonstrate the increased stability of the interpolymer system over the maleic anhydride/methyl vinyl ether copolymer control.

TIME AT 80° C/RUN NO. CONTROL

| Time | pH | Brookfield visc., cps. | Spindle speed, r.p.m. | Spindle No. |
|---|---|---|---|---|
| Zero | 7.9 | 44 | 6 | 1 |
| 16 hr | 7.7 | 15 | 6 | 1 |
| 38 hr | 7.6 | 8 | 6 | 1 |
| 62 hr | 7.6 | 8 | 6 | 1 |

TIME AT 80° C./RUN NO. C

| Time | pH | Brookfield visc., cps. | Spindle Speed, rpm. | Spindle No. |
|---|---|---|---|---|
| Zero | 8.6 | 46,700 | 6 | 4 |
| 16 hr | 8.5 | 41,300 | 6 | 4 |
| 38 hr | 8.5 | 29,600 | 6 | 4 |
| 62 hr | 8.3 | 15,000 | 6 | 4 |

EXAMPLE II

A solution of the divinyl ether of diethylene glycol was made up by weighing 3.5 g. of the diethylene glycol divinyl ether and adding same to a 50 ml. volumetric flask. Benzene was added at room temperature to make up a 50 ml. solution. This solution was labeled Solution DEG.

A Pyrex polymerization tube was charged with 4 ml. of Solution DEG and 100 ml. of Solution M prepared as in Example I. The tube was cooled to −75° C. in a Dry Ice-acetone bath, evacuated to 20 mm. and flushed with nitrogen gas three times, and finally reevacuated to 20 mm. The neck of the ploymerization tube was then sealed off by means of a glass-blowing torch. The sealed tube was stored in a 5° C. refrigerator overnight. The next morning it was allowed to warm to room temperature, was shaken to insure uniform solutions and placed in a 55.2° C. constant temperature water bath for 5 hours and 5 minutes. After removing and cooling to room temperature the tube was opened. A voluminous precipitate of polymer had formed in the tube. To the tube was added 50 ml. benzene to thin out the system. This was filtered through a tared, sintered-glass funnel. The tube was rinsed as free as possible of polymer by adding 50 ml. more benzene in three portions and filtering as before. The filter cake was reslurried twice in the filter funnel with 50 ml. portions of benzene and sucked dry as possible. This was done to remove any residual unreacted monomers. The polymer samples were dried to constant weight in a 45° vacuum oven, yielding fine particle size powder.

EXAMPLE III

The following solutions were prepared:

Solution M 80.0 g. (0.816 mole) maleic anhydride were dissolved in 800.0 g. of benzene and filtered to remove a slight haze (free maleic acid). 60.00 g. (0.833 mole) distilled ethyl vinyl ether were dissolved therein.

Solution M–LP

A solution of 0.096 g. lauroyl peroxide in 564.0 g. of Solution M.

Solution M–LP–2D

A solution of 0.240 g. 1,4-divinyloxybutane in 188.0 g. of Solution M–LP.

Several Pyrex polymerization tubes were charged as follows:

| Tube No. | Solution M–LP (g.) | Solution M–LP–2D (g.) |
|---|---|---|
| 1 | 94.0 | |
| 2 | 89.3 | 4.70 |
| 3 | 79.9 | 14.10 |
| 4 | 47.0 | 47.0 |
| 5 | | 94.0 |

The tubes were cooled to −75° C. in a Dry Ice-acetone bath, evacuated to 2 mm. by means of vacuum oil pump, and sealed off by means of a glass blowing torch. After warming to room temperature the tubes were inverted several times to insure uniformity and placed in a 60° C. constant temperature bath for 6 hours and 55 minutes. They were then removed and placed in cool water. A voluminous polymer precipitate had formed in each tube. The contents of each tube were worked up in the same manner described in Example I and dried in a 42° C. vacuum oven to a constant weight.

A 5 g. portion of each polymer was dissolved in 95 g. of distilled water by tumbling at room temperature for 4 days. The pH and Brookfield viscosities determined in each case were as follows:

| Sample No. | Percent 1,4-di-vinyloxybutane based on ethyl vinyl ether | pH | Brookfield Viscosity, cps. | Spindle No. | Speed (r.p.m.) |
|---|---|---|---|---|---|
| 1 | 0 | 2.1 | 2.95 | 2 | 60 |
| 2 | 0.10 | 2.0 | 69.0 | 2 | 60 |
| 3 | 0.30 | 1.9 | 200 | 2 | 60 |
| 4 | 1.0 | 2.0 | 1,450 | 4 | 60 |
| 5 | 2.0 | 2.0 | 3,600 | 4 | 60 |

Various modifications and variations of this invention will be obvious to a worker skilled in the art and it is understood that such modifications and variations are to be included within the purview of this application and the spirit and scope of the appended claims.

I claim:
1. A water-soluble crosslinked interpolymer consisting essentially of substantially equimolar quantities of maleic anhydride and a monovinyl alkyl ether wherein the alkyl group contains from 1 to 4 carbon atoms and 0.001 to .2 mole percent, based on the monovinyl alkyl ether, of a crosslinking agent having the formula selected from the class consisting of

$$H_2C=CH-O-X_1-OCH=CH_2$$

and $$H_2C=CH_2-(OX_2)_n-OCH=CH_2$$

where $X_1$ represents an alkylene group of two to twelve carbon atoms and $X_2$ represents an alkylene group of two to four carbon atoms and $n$ represents an integer of 2 to 100.

2. Water-soluble crosslinked interpolymers as in claim 1, wherein the monovinyl alkyl ether is methyl vinyl ether.
3. Water-soluble crosslinked interpolymers as in claim 1, wherein the monovinyl ether is ethyl vinyl ether.
4. Water-soluble crosslinked interpolymers as in claim 1, wherein the crosslinking agent has the formula $$H_2C=CH-O-X_1-O-CH=CH_2$$

and $X_1$ represents a butylene radical.

5. Water-soluble crosslinked interpolymers as in claim 1, wherein the crosslinking agent has the formula $$CH_2=CH-(OX_2)_n-OCH=CH_2$$

and $X_2$ is ethylene and $n$ is 2.

References Cited

UNITED STATES PATENTS 2,985,625   5/1961   Jones _____ 260—78.5

JOSEPH L. SCHOFER, Primary Examiner.
JOHN KNIGHT III, Assistant Examiner.

U.S. Cl. X.R.
260—29.6, 78, 80.72, 80.75, 80.76

UNITED STATES PATENT OFFICE
CERTIFICATE OF CORRECTION

PATENT NO. : 3,448,088
DATED : June 3, 1969
INVENTOR(S) : Julian Louis Azorlosa

It is certified that error appears in the above-identified patent and that said Letters Patent are hereby corrected as shown below:

Column 1, lines 15 and 54, for each occurrence of "percent", read --, per mole of monovinyl alkyl ether,--

Column 2, lines 15 and 16, for "monovinyl ether units to divinyl ether units is of", read --divinyl ether units to monovinyl ether units is--

Column 6, line 26, for "percent, based on", read --, per mole of--

Signed and Sealed this

Twentieth Day of September

[SEAL]

Attest:

RUTH C. MASON
Attesting Officer

LUTRELLE F. PARKER
Acting Commissioner of Patents and Tradem